T. W. ROACH.
SAW TENSIONING AND STRAIGHTENING MACHINE.
APPLICATION FILED MAY 6, 1912.
1,053,746.
Patented Feb. 18, 1913.
2 SHEETS—SHEET 2.
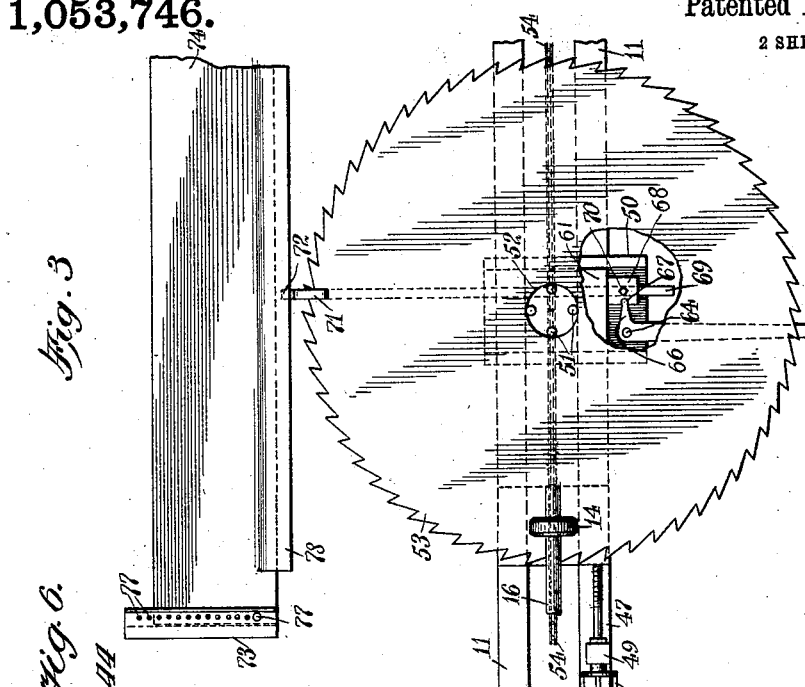
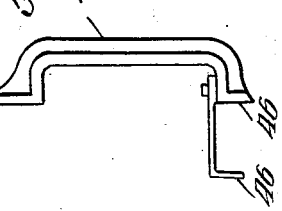
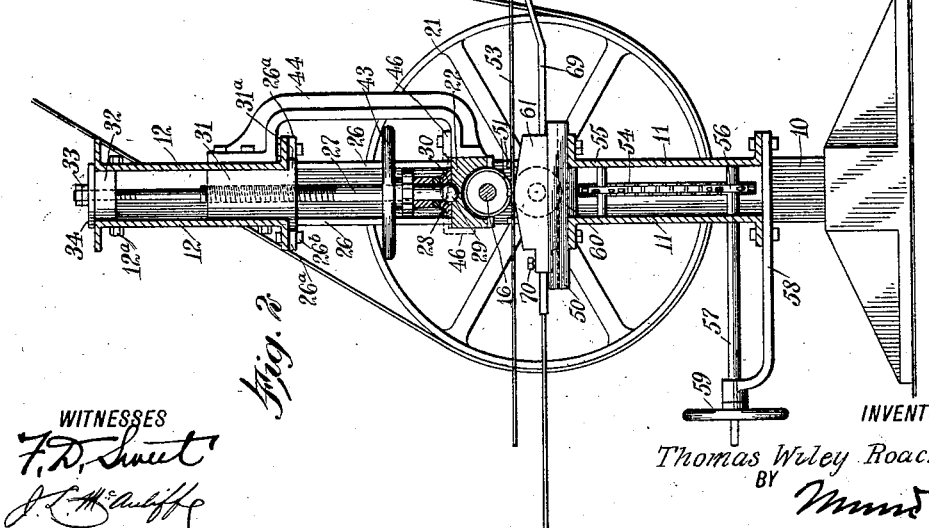
WITNESSES
INVENTOR
Thomas Wiley Roach
BY
ATTORNEYS

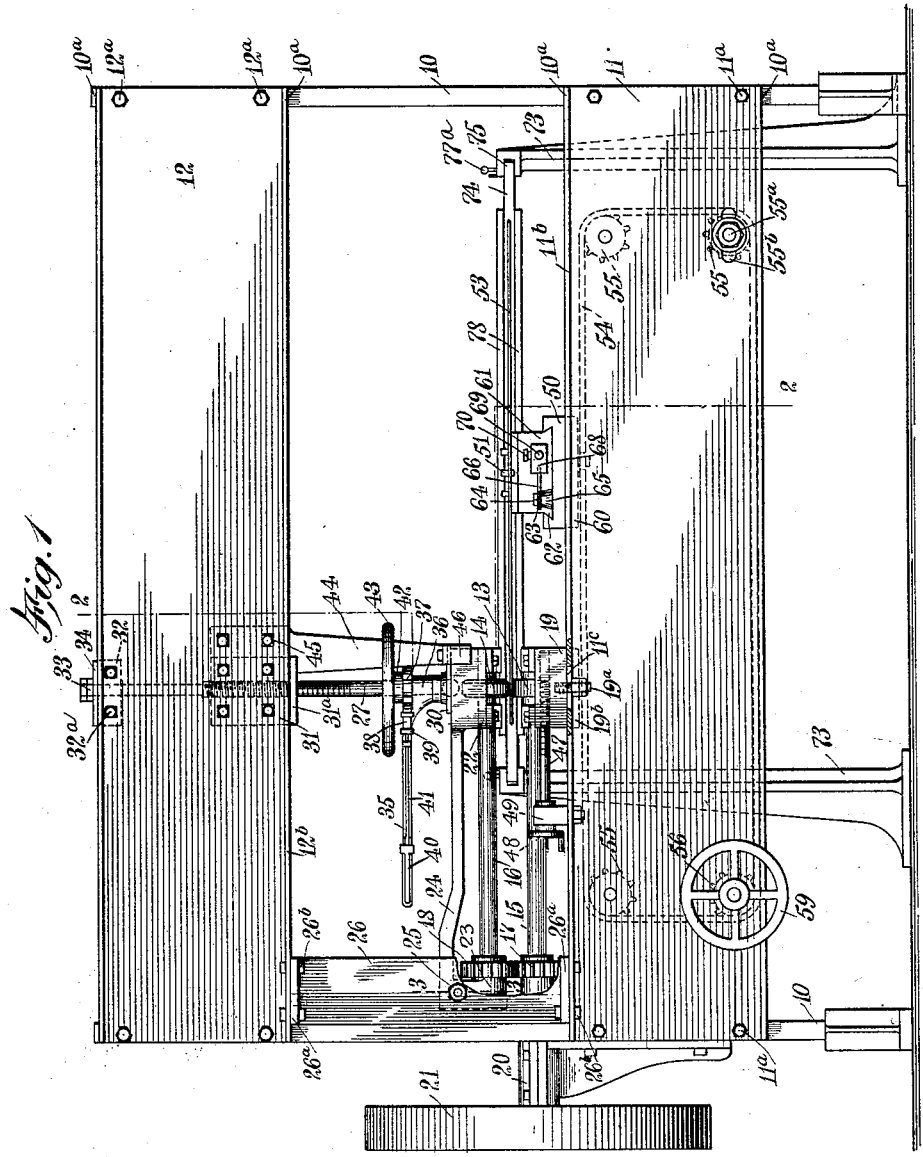

UNITED STATES PATENT OFFICE.

THOMAS WILEY ROACH, OF LYMAN, WASHINGTON.

SAW TENSIONING AND STRAIGHTENING MACHINE.

1,053,746.  Specification of Letters Patent.  Patented Feb. 18, 1913.

Application filed May 6, 1912. Serial No. 695,414.

*To all whom it may concern:*

Be it known that I, THOMAS WILEY ROACH, a citizen of the United States, and a resident of Lyman, in the county of Skagit and State of Washington, have invented a new and Improved Saw Tensioning and Straightening Machine, of which the following is a full, clear, and exact description.

The invention relates to machines for performing the work of what is known as rolling saws for tension.

My improved machine is especially designed for operating on circular saws, although not limited in all its features for use with circular saws. The improved machine is serviceable also for use in straightening a concaved saw that has been forced over the saw collar.

Main objects of my invention are to provide a construction of tension rolling machines of the character referred to, in which the rollers for acting on the saw may be conveniently adjusted to suit the particular character of the saw being operated upon; to provide an improved means for applying pressure on the rollers; to provide an improved means for feeding the saws to the tension rollers whereby the rollers may be caused to take a circular course over the surface of the saw, or a spiral course; to provide means whereby the operator may test the condition of the tension of the saw without removing the saw from the machine; and to otherwise improve the machine to the end that it may have a maximum of efficiency while involving a simple construction and arrangement of parts.

Reference is to be had to the accompanying drawings forming a part of this specification, in which similar characters of reference indicate corresponding parts in all the figures.

Figure 1 is a front elevation, with parts broken out, of a machine constructed in accordance with my invention; Fig 2 is a transverse vertical section of the machine, approximately on the line 2—2 of Fig. 1; Fig. 3 is a fragmentary plan view given to show a means for adjusting the saw carriage to vary the feed, and the means for testing the condition of the tension of the saw; Fig. 4 is a detail sectional view on a larger scale, the section being taken on approximately the line 3—3 of Fig. 1; Fig. 5 is a fragmentary side elevation showing modified means for moving one of the bearings of the tension rollers; and Fig. 6 is a side elevation of a guide bracket hereinafter referred to.

In constructing the machine as shown in the drawings, end standards 10 are provided, suitably formed at their lower ends to give proper base support, and to the opposite sides of said standards are secured upper and lower pairs of frame plates 11, 12, said plates being let into the edges of the standards 10 so that the latter provides shoulders at 10$^a$, between which the plates 11, 12, are received, the connection between the plates 11 and the standards 10 being completed by bolts 11$^a$, 12$^a$. All the frame plates are shown as of channel iron, but it will be understood, however, that any suitable frame plates may be employed.

The tensioning rollers are indicated by the numerals 13, 14, the special shape of these rollers being of an accepted form for analogous work, either for tensioning saws or for straightening concaved saws. The rollers are mounted respectively on shafts 15, 16, having intermeshing spur pinions 17, 18. The lower shaft 15 has a bearing at its inner end in the box 19 in which the roller 13 carried by said shaft is bedded, and a bearing 20, preferably exterior of the frame, supports the shaft at the outer end, there being a drive pulley 21 on the shaft outside of the bearing 20. A hanger box 22 supports the inner end of the shaft 16, and the upper roller 14 carried thereby, while the outer end of the shaft is supported in a hanger box 23, both the boxes 22 and 23 being pendent from a frame 24, which is hung at one end between centers 25 carried by cheek plates or posts 26 that extend vertically at the front and back of the machine and are secured by their upper and lower flanges 26$^a$ to the flanges 11$^b$, 12$^b$ of the plates 11 and 12, respectively, as by bolts 26$^b$. The described mounting of the frame 24 carrying the shaft 16, permits the said frame and shaft to move vertically so that the upper roller 14 may be moved toward and from the lower roller 13.

The inner end of the frame 24 is under the influence of a vertical pressure screw 27, swiveled to the hanger bearing 22. The swivel connection between the pressure screw 27 and the hanger bearing 22 is desirably effected by means of a ball-head 28 formed on the lower end of the screw, the same being received in a socket 29 in the bearing, there being plates 30 secured to the bearing 22 above the ball 28, to retain said ball in place. The pressure screw 27 has threaded movement in a block 31 suitably secured between the upper frame plates 12, and provided with lateral lugs 31ª at the bottom to engage the under side of the plates 12 and resist the upward thrust of the screw 27. Above said block 31 there is a top block 32 secured to the plates 12, by bolts 32ª (Fig. 1), the extreme upper end of the pressure screw being provided with adjusting nuts 33 that bear on a cross plate 34 through which the pressure screw passes, and which overlies the top edges of the plates 12. It will be understood that the pressure screw passes freely through the block 32 and has threaded engagement with the block 31. The pressure screw has means for moving it axially to regulate the distance between the rollers 13, 14, and to this end two devices are provided, one to give a quick movement to the screw in raising and lowering the upper roller to suit the thickness of the saw, and an auxiliary actuating device to exert the necessary pressure on the saw. Thus a suitable ratchet lever 35 extends from a loose hub 36, and is provided with any approved form of latch and controlling means to coöperate with teeth 37 on the member fitted on the pressure screw 27. In the example shown, a radially sliding pawl 38 has movement in a keeper 39, and is connected with a finger latch 40 by a wire 41, the arrangement being such as to permit of the ready engagement or disengagement of the pawl 38 relatively to the teeth 37, which teeth are formed in the illustrated example on a hub 42 fast on the screw 27. A hand wheel 43 is also fast on the screw 27. A quick movement is given to the pressure screw by the hand wheel 43 to raise or lower the upper roller 14 to suit the thickness of the saw, and the lever is then operated to exert the desired pressure on the saw. Guided movement is given to the frame 24 at its inner end in response to the movement of the screw 27. In the illustrated example the guiding means, which also acts to brace the frame 24 against lateral strain, consists of a curved bracket 44 secured by its upper end to the frame, as at 45, and curving around the wheel 43, the lower end of the bracket being forked to provide depending arms 46 on said bracket, so that the said depending arms embrace the hanger bearing 22 at the front and back, while permitting said bearing to have vertical movement relatively to said bracket arms.

Means are provided for laterally adjusting the crown of the lower roller 13 to that of the upper roller 14, to suit the crown of the upper roll when rolling straight or bevel crown saws, and to this end the bearing block 19 of the lower roll is adapted to be shifted endwise by means of the hand screw 47 which has threaded engagement with said bearing 19. The screw 47 has wrench-receiving pins 48, and works in the forked post 49, so that the turning of the hand screw 47 will shift the lower roller 13 endwise to bring its crown more or less into register with that of the upper roll, to suit the particular character of the saw; slots 11ᶜ in the frame plates 11 and bolts 19ª on bearing 19 permit movement of the bearing 19 and hold the bearing against vertical displacement. Downward extensions 19ᵇ on the bearing 19 fit between the plates 11 and prevent lateral displacement of said bearing.

I provide an improved means for mounting the saw and shifting it toward and from the tensioning rollers; thus there is a carriage or carrier block 50 having pins or equivalent centering devices 51 projecting upwardly at its upper surface, which are adapted to be received in the eye 52 of a circular saw 53. The saw carriage 50 is mounted on the upper stretch of an endless sprocket chain 54, which runs over idlers 55 disposed between the lower frame plates 11. One of the idlers 55 has its shaft or bolt 55ª extended through slots 55ᵇ to slide in said slots in order to take up slack in the chain. In connection with the sprocket chain 54, a sprocket pinion 56 is arranged, being mounted on a shaft 57 having bearings in a suitable bracket 58 desirably bolted to the bottom flanges of the plates 11, said shaft 57 being provided at its outer end with a hand wheel 59, so that the turning of the hand wheel will actuate the chain 54, and cause the carriage 50 to move the saw toward and from the tension rollers, as will be readily understood. The pins 51 in practice, removably fit holes in the carriage and the holes are in such number and arrangement as to permit of changing the pins to suit the saw.

The carriage 50 has a downwardly projecting member 60 on the under side that has guided movement between the frame plates 11, as shown best in Fig. 2; and the chain 54 is suitably fastened to the said member 60. The carriage 50 is made with a saddle 61, and on which saddle the pins 51 are provided and the saw 53 is seated. The saddle 61 has dovetail engagement, as at 62, with the base of the carriage, to slide transversely so as to shift the center of the saw laterally as may be desired. For moving the saddle transversely in the carriage, a bell-crank lever 63 is fulcrumed as at 64 on an upwardly projecting stud 65 on the base of the carriage 50, and the short angular arm 66 of said lever engages in a notch, as at 67, in an extension 68 formed on the saddle 61, so that by throwing the lever 63, the saddle 61 may move to one side or the other of the line of travel of the carriage, thus shifting the center of the saw to either side of the travel of the carriage.

To afford a support for the circular saw, a lateral arm 69 is provided, which passes through the saddle 61 and is secured in any adjusted position by a set screw 70, the said arm at its outer end being return-bent to provide a hook formation to engage the perimeter of the saw. The feed of the carriage toward and from the rollers proceeds only while the rollers are gripping the saws, and when the saddle is shifted to throw the center of the saw to one side of the longitudinal travel of the carriage, the rollers will automatically feed the saw and take a spiral course over the surface of the saw, the automatic feed being faster or slower according to the greater or less distance the center of the carriage is shifted from the center of the longitudinal travel. When the hand wheel 59 is rotated at uniform speed, the convolutions of the spiral course thus traversed by the rollers will be the same distance apart from the eye to the perimeter of the saw, regardless of the increasing number of the revolutions made by the rollers in traveling in gradually larger convolutions as the rollers approach the perimeter of the saw, and thus the action of the rollers on the saw is uniform.

To provide means by which the operator may test the condition of the tension of a saw without removing the saw from the machine, I employ a device to co-act with the outer end of the supporting arm 69, said device comprising any suitable standards or other supports 73, between which is slidably supported a horizontal plate 74, the ends of which slide in grooves 75 formed on the inner face of the standards 73, at the upper end. The plate 74 is adapted to be adjusted laterally in its ways or guide grooves 75 to suit the size of different saws, and on one or both of the standards graduations are produced, as at 76. Vertical apertures 77 corresponding with the graduations extend through the upper portions of the standards and corresponding apertures are provided in the plate 74 and pins 77$^a$ serve to secure the plate in the adjusted position. That side of the plate 74 toward the saw is formed with flanges 78 spaced a distance apart to receive a suitable member, such as a lug 72 on the hooked end 71 of the arm 69. With the arm 69 thus engaging the plate 74, the operator may throw the weight of his body onto the saw to spring it across the carriage, whereby he may examine the curvature of the surface of the saw by means of a straight edge, which is the usual means of determining the condition of the tension. It will be observed therefore that the machine provides a means for testing the tension of the saw without disturbing the adjustment of the tension devices, or the relative positions of the saw and tensioning roller, or removing the saw from the carriage.

In Fig. 5 I have shown a modified arrangement for turning the shaft 47$^a$ of the bearing block 19, in which figure the said shaft is provided with a bevel gear 80 that meshes with a bevel gear 81 on a transverse shaft 82 mounted in bearings 83 on a lateral bracket 84, said shaft 82 being provided with a crank handle 85 so that the turning of the said handle rotates the shaft 82 and through the mentioned gears turns the shaft 47$^a$ to adjust the position of the bearing block 19.

Having thus described my invention, I claim as new and desire to secure by Letters Patent,—

1. The combination of a main frame, a swing frame, shafts on said frames carrying rollers, a pressure device acting on said swing frame, and a guide bracket giving guided movement to and forming a brace for the swing frame, the said guide bracket depending from a fixed portion of the main frame above the swing frame and having spaced guide arms at its lower end embracing opposite sides of the swing frame, near the free end of the latter.

2. In a tensioning machine for saws, tensioning devices, a saw carriage mounted to travel toward and from the tensioning devices, and a saw support on the said carriage movable laterally to the line of travel of the carriage.

3. In a machine for tensioning saws, tensioning devices, a saw carriage, means for supporting a saw while permitting it to rotate, and means for adjusting the saw laterally to the direction of travel of the carriage.

4. In a machine for tensioning saws, tensioning devices, a saw carriage, means on said carriage for supporting a circular saw at the center thereof, and means on the carriage for supporting the perimeter of the saw.

5. In a machine for tensioning saws, the combination with tensioning devices, of a carriage movable toward and from the tensioning devices, means on the carriage for supporting a saw at the center, a shifting device for moving said means transversely to the direction of travel of the carriage, and a support on the carriage for the outer portion of the saw.

6. In a machine for tensioning saws, the combination with tensioning devices, of a saw-supporting means including a member extended to engage the outer end of the saw, and a means for engaging said member and holding it against movement transversely to the plane of the saw and thus holding the perimeter of the saw to permit the saw to be sprung into curved form.

7. In a machine for tensioning saws, the combination with tensioning devices and a saw support, of means for testing the tension of the saw, said means comprising a member for engaging the outer portion of the saw, and a device for holding said member and the saw held thereby against movement transversely to the plane of the saw when the saw is sprung into curved form.

8. In a machine for tensioning saws, the combination with tensioning devices and a saw support, of means for testing the tension of the saw, said means comprising a device co-acting with the saw support and serving to engage the outer portion of the saw, and a member movable to engage said device to hold the same and with it, the saw, against movement transversely to the plane of the saw.

9. In a machine for tensioning saws, the combination of a main frame having upper and lower longitudinally ranging members, a swing frame between said upper and lower main frame members, the swing frame being pivoted at its outer end to the main frame and ranging in the direction of the opposite end, a vertical screw taking into a fixed part of the mentioned upper frame member and bearing at its lower end against the swing frame, a tensioning roller having bearings in the free end of the swing frame, a sliding bearing block below the said roller, a second tensioning roller journaled in said block to co-act with the first roller, an adjusting screw for shifting said sliding bearing block, and saw-supporting means mounted on the mentioned lower frame member and movable toward and from the tensioning rollers.

10. In a machine for tensioning saws, the combination with tensioning rollers, of a saw carriage movable toward and from said rollers, a saddle on the saw carriage having means to support a saw thereon, the saddle being movable transversely to the longitudinal travel of the carriage, and a manually-controlled shifting device for said saddle.

In testimony whereof I have signed my name to this specification in the presence of two subscribing witnesses.

THOMAS WILEY ROACH.

Witnesses:
J. A. SUMPTER,
J. R. ATTERBERRY.

Copies of this patent may be obtained for five cents each, by addressing the "Commissioner of Patents, Washington, D. C."